(12) United States Patent
Canini et al.

(10) Patent No.: US 7,075,663 B2
(45) Date of Patent: Jul. 11, 2006

(54) OPTICAL DEVICE AND A METHOD FOR AIMING AND VISUALLY INDICATING A READING AREA

(75) Inventors: Federico Canini, Zola Predosa (IT); Valeria Palestini, Calderara di Reno (IT)

(73) Assignee: DATALOGIC, S.p.A., Bologna (IT)

( * ) Notice: Subject to any disclaimer, the term of this patent is extended or adjusted under 35 U.S.C. 154(b) by 0 days.

(21) Appl. No.: 10/963,723

(22) Filed: Oct. 14, 2004

(65) Prior Publication Data
US 2005/0046827 A1   Mar. 3, 2005

Related U.S. Application Data

(63) Continuation of application No. 09/400,865, filed on Sep. 21, 1999, now abandoned.

(30) Foreign Application Priority Data
Oct. 30, 1998   (EP) .................................. 98830656

(51) Int. Cl.
*G01B 11/14* (2006.01)
*G06K 7/10* (2006.01)

(52) U.S. Cl. ...................... 356/614; 356/622; 356/624; 356/139.08; 235/454; 235/462

(58) Field of Classification Search ........ 356/614–625, 356/138–154, 4.06, 4.07, 4.08, 628; 250/341.7, 250/342, 340, 226, 223 R; 359/739, 558; 235/462, 472, 454
See application file for complete search history.

(56) References Cited

U.S. PATENT DOCUMENTS

| | | | |
|---|---|---|---|
| 3,010,019 A | 11/1961 | Walter Sohst | |
| 3,617,135 A | 11/1971 | Betz | |
| 3,853,227 A | 10/1974 | Kato et al. | |
| 4,108,551 A * | 8/1978 | Weber | 356/4.01 |
| 4,149,686 A * | 4/1979 | Stauff et al. | 244/3.16 |

(Continued)

FOREIGN PATENT DOCUMENTS

DE   3 615 714 A1   11/1987

(Continued)

OTHER PUBLICATIONS

Patent Abstracts of Japan vol. 98, No. 1, Jan. 1998, Pub. No. 09247362, K. Toshimi.

(Continued)

*Primary Examiner*—Gregory J. Toatley, Jr.
*Assistant Examiner*—Sang H. Nguyen
(74) *Attorney, Agent, or Firm*—Nixon & Vanderhye, P.C.

(57) ABSTRACT

The invention relates to an optical device for aiming along an optical axis and visually indicating a reading area, comprising at least an illuminating assembling acting on a portion of the reading area along an optical emission path. The illuminating assembly comprises a light beam emitting source, a diaphragm having a preset shape, such diaphragm being effective to select a portion of the light beam generated by said emitting source, and a converging lens placed, on the optical emission path, downstream of the diaphragm and adapted to collimate the shaped light beam coming from the diaphragm and project it onto a portion of the reading area. The device of this invention is at once economical and accurate (i.e. capable of producing sharp images), thereby providing the user with a clear cut indication of the reading area being aimed regardless of the distance of the latter from the device.

34 Claims, 7 Drawing Sheets

U.S. PATENT DOCUMENTS

| | | | |
|---|---|---|---|
| 4,816,659 A | | 3/1989 | Bianco et al. |
| 4,856,879 A | | 8/1989 | Gehmann |
| 5,052,790 A | * | 10/1991 | Edwards et al. ............ 359/399 |
| 5,088,818 A | | 2/1992 | Nicholson |
| 5,280,161 A | | 1/1994 | Niwa |
| 5,304,813 A | | 4/1994 | De Man |
| 5,397,885 A | | 3/1995 | Massieu et al. |
| 5,491,546 A | * | 2/1996 | Wascher et al. ........... 356/4.03 |
| 5,513,000 A | * | 4/1996 | Smith et al. ............. 356/152.2 |
| 5,600,121 A | | 2/1997 | Kahn et al. |
| 5,638,220 A | | 6/1997 | Ohtomo et al. |
| 5,738,595 A | * | 4/1998 | Carney ...................... 473/209 |
| 5,747,823 A | | 5/1998 | Ishitsuka et al. |
| 5,793,033 A | * | 8/1998 | Feng et al. ............ 235/472.01 |
| 5,814,803 A | | 9/1998 | Olmstead et al. |
| 5,929,444 A | * | 7/1999 | Leichner ................. 250/341.7 |
| 5,979,760 A | | 11/1999 | Freyman et al. |
| 6,021,946 A | | 2/2000 | Hippenmeyer et al. |
| 6,233,098 B1 | | 5/2001 | Plesko |
| 6,480,289 B1 | * | 11/2002 | Shimomura et al. ........ 356/614 |

FOREIGN PATENT DOCUMENTS

| | | |
|---|---|---|
| EP | 0 377 973 | 7/1990 |
| FR | 2 673 738 | 9/1992 |
| UA | 97/31340 | 2/1996 |

OTHER PUBLICATIONS

Patent Abstracts of Japan vol. 018, No. 690, Dec. 1994, Pub. No. 06274668, U. Naotoshi.

Patent Abstracts of Japan vol. 095, No. 10, Nov. 1995, Pub. No. 07193682, S. Satoru.

* cited by examiner

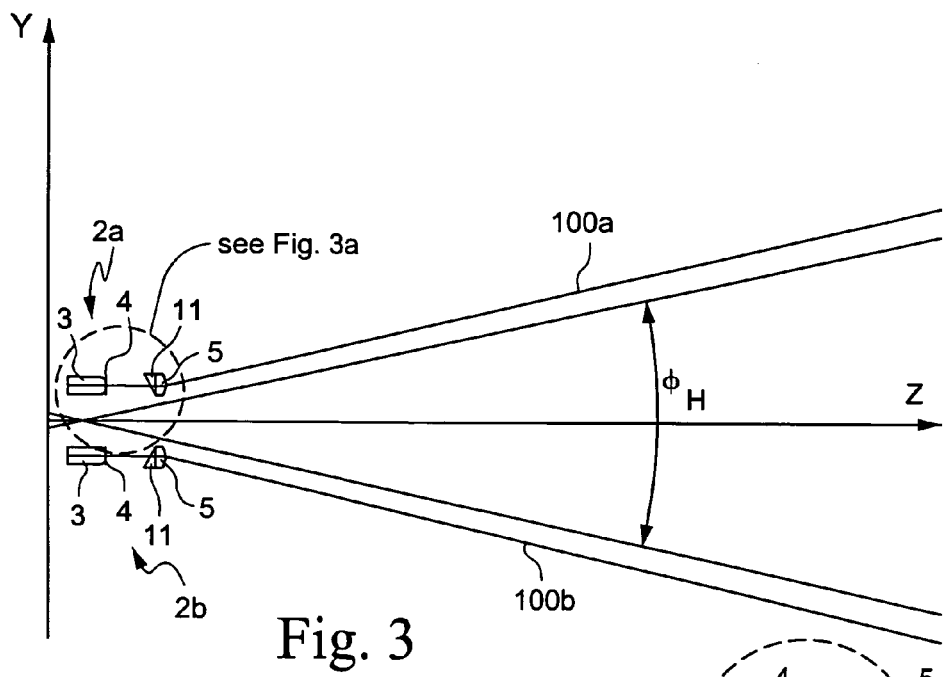
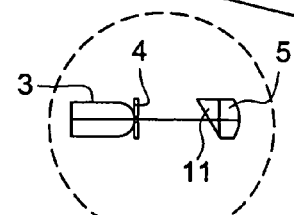
Fig. 3
Fig. 3a
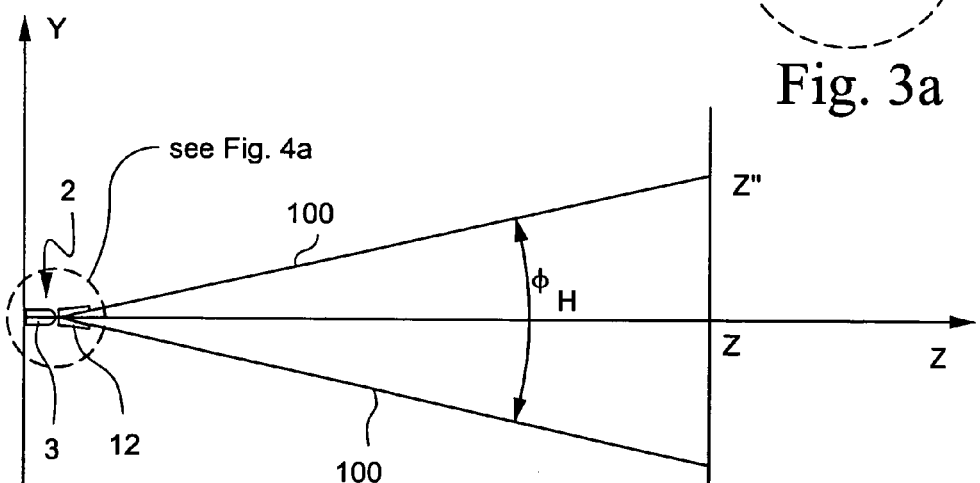
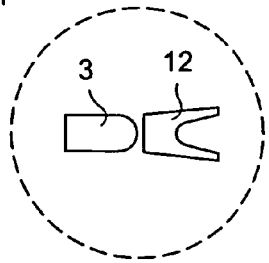
Fig. 4
Fig. 4a

OPTICAL DEVICE AND A METHOD FOR AIMING AND VISUALLY INDICATING A READING AREA

This is a continuation of application Ser. No. 09/400,865 filed Sep. 21, 1999, now abandoned.

BACKGROUND OF THE INVENTION

1. Field of the Invention

This invention relates to an optical device and a method for aiming and visually indicating a reading area. In particular, the invention relates to an optical device and a method for aiming a reading area, so as to provide an operator with a visual indication of the framed area allowing him to more conveniently read the enclosed information therein, e.g. object-identifying information contained in optical codes applied to the objects.

The invention also relates to a device and a method for determining the distance from and the orientation of the reading area with respect to the device.

2. Discussion of Prior Art

Optical aiming devices are known which can provide an operator with a visual indication of a framed area. In particular, it is known to use such devices in optical readers to allow the reader to be properly positioned over an area containing the information to be read, thereby to optimize subsequent reading operations.

Such aiming devices typically comprise a plurality or emission sources adapted to project respective light beams onto end portions of the framed area to obtain each time a visual indication of the framed area border edges, and hence of the field or view subtended by the reader.

In general, the emission sources used in such devices are LED or laser sources.

LED-based aiming devices are relatively inexpensive and of simple construction, but they have a drawback in that the light beams emitted by them are poorly collimated and, consequently, produce not bright and clear images on the illuminated surfaces. LED devices are therefore suitable for illuminating reading areas which are placed very close.

On the other hand, many applications of optical readers demand that a clear sharp indication of the border edges of the area subtended by the reader be provided. For the purpose, laser aiming devices have been developed which emit well collimated and defined light beams through a great depth of field.

However, laser devices have a major drawback in their high cost.

BRIEF SUMMARY

The underlying technical problem of this invention is to provide an aiming device which is inexpensive yet accurate (i.e., capable of generating sharp images on the illuminated surfaces), so as to provide a user with a clear and precise indication of the reading area being aimed regardless of its distance from the device.

Accordingly, a first aspect of this invention relates to an optical device for aiming along an axis Z and visually indicating a reading zone, which device comprises at least one illuminating assembly acting on a reading zone portion along an optical emission path, characterized in that said at least one illuminating assembly comprises:

a light source;
a diaphragm having a preset shape for selecting a portion of the light generated by said source;
a converging lens placed downstream of the diaphragm to collimate the shaped light coming from the diaphragm and project it onto the reading zone portion.

Throughout this description and the appended claims, the term "aiming axis" of the device is used to indicate a longitudinal axis of the device which intersects an imaginary reading area, e.g. rectangular or circular in shape, at a central point thereof.

The aiming device of this invention is of simple and inexpensive construction, owing to the use of LEDs as the sources of emission therein. High accuracy and definition features are achieved for the light beam by that a diaphragm and a converging lens are interposed between each LED and the reading zone; the converging lenses project portions of the light beam, as preliminarily shaped and picked up on the diaphragms (such portions will also be referred to as "patterns" hereinafter), onto the extremities of the reading zone to provide a visual indication of the border edges of said zone.

Advantageously, the converging lens is positioned at a suitable distance from the diaphragm such that the shaped light coming from the diaphragm will be focused onto the reading zone portion.

Advantageously, the device of this invention includes at least two first illuminating assemblies disposed symmetrically relative to the aiming axis Z such that their respective optical emission paths will identify a linear portion on the reading zone. This form of visual indication is advantageous especially when reading linear optical codes (such as bar codes).

Preferably, the device includes at least two second illuminating assemblies disposed symmetrically relative to the aiming axis Z of the device such that their respective optical emission paths will identify, jointly with the optical paths of the first illumination assemblies, a quadrangular portion on the reading zone.

Thus, the device of this invention enables the reading zone framed by it to be identified by the visual indication of four opposite edges of the zone. This form of visual indication is advantageous especially when reading two-dimensional optical codes and images.

Advantageously, the light source generates an inclined optical beam with respect to a first and a second reference plane XZ, YZ lying perpendicular to and intersecting each other along the aiming axis Z. This inclined setting can advantageously be obtained either by means of an optical deflection prism or of a pair of optical deflection prisms.

Throughout this description and the appended claims, the term "first reference plane" is used to indicate an imaginary symmetry plane of the device lying substantially parallel to an imaginary horizontal rest plane of the device and containing the aiming axis, and the term "second reference plane" is used to indicate an imaginary symmetry plane of the device substantially normal to the first reference plane and also containing the aiming axis of the device.

To achieve a high degree of flexibility in use, combined with an effective framing of the reading zone, the device of this invention is arranged to subtend an increasingly larger reading zone as the distance of said zone from the device is increased.

For this purpose, in a first embodiment of the inventive device, the optical paths of the first illuminating assemblies are set at an angle, relative to the axis Z, of $+\phi_v/2$ and $-\phi_v/2$, respectively, on the first reference plane XZ, and at an angle of $+\phi_H/2$ and $-\phi_H/2$, respectively, on the second reference plane YZ. Likewise, the optical emission paths of the second illuminating assemblies are advantageously set at an angle, relative to the axis Z, of $+\phi_v/2$ and $-\phi_v/2$, respectively, on the first reference plane XZ, and at an angle of $+\phi_H/2$ and $-\phi_H/2$, respectively, on the second reference plane YZ.

Preferably, the device includes at least one substantially tubular element having an inclined upper surface adapted to accommodate he light source such that the optical path of the illuminating assembly will be inclined at angles of $\pm\phi_v/2$ and $\pm\phi_H/2$ relative to the axis Z. Advantageously, these tubular elements allow a desired inclination or the emission paths to be achieved in a simple and functional manner even for different devices, thereby providing for series repeatability in the assembly process thereof, and evenness of performance through the various devices.

In a second embodiment of the inventive device, each optical emission path of the first and second illuminating assemblies comprises a first path length set at an angle, relative to the axis Z, of $+\phi_v/2$ and $-\phi_v/2$ ($+\phi_H/2$ and $-\phi_H/2$), respectively, on the first (second) reference plane XZ (YZ), and a second path length set at an angle, relative to the axis Z, of $+\phi_v/2$ and $-\phi_v/2$ ($+\phi_H/2$ and $-\phi_H/2$), respectively, on the first (second) reference plane XZ (YZ), and at an angle of $+\phi_H/2$ and $-\phi_H/2$ ($+\phi_v/2$ and $-\phi_v/2$), respectively, on the second (first) reference plane YZ (XZ).

Preferably, the device includes an optical deflection prism adapted to deflect the second path lengths through angles of $\pm\phi_H/2$ ($\pm\phi_v/2$). In this embodiment, the illuminating assemblies are inclined relative to only one of said reference planes of the device, the inclination of the optical emission paths relative to the other reference plane being provided in a simple and functional manner by said optical prisms. Advantageously, this is effective to minimize the risk of errors in the positioning of the light sources inside the device and/or different devices, and ensure evenness of performance through the various devices.

The optical prisms are made of a plastics material and may be placed, for instance, between their respective light sources and the converging lenses. Advantageously, they can be unitized with their respective converging lenses into a single optical element to be molded from a plastics material, for example.

In a preferred embodiment of the inventive device, each optical emission path of the first and second illuminating assemblies comprises a first path length lying substantially parallel to the aiming axis Z, and a second path length set at an angle of $+\phi_v/2$ and $-\phi_v/2$, respectively, relative to the axis Z, on the first reference plane XZ, and at an angle of $+\phi_H/2$ and $-\phi_H/2$, respectively, on the second reference plane YZ.

Preferably, the device includes a pair of optical deflection prisms, arranged on each optical emission path to deflect the second path lengths through angles of $\pm\phi_H/2$ and $\pm\phi_v/2$. In this embodiment, the illuminating assemblies are all parallel to the aiming axis of the device, the inclination of the optical paths relative to the two reference planes being obtained, in a simple and functional manner, by means of said pair of prisms. In this way, the risk of errors in the positioning of the light sources inside the device and/or different devices can be further attenuated, for enhanced evenness of performance through the various devices.

Preferably, the optical prisms of each pair of optical prisms are of integral construction and are placed downstream of the converging lens on the optical emission path. More preferably, the optical prisms of each pair of optical prisms are formed integrally with the optical prisms of the pair of optical prisms located on the same side with respect to the second reference plane YZ. Advantageously, the pairs of optical prisms located on the opposite side with respect to the second reference plane YZ are mutually associated by means of a mounting plate. Thus, the prisms can be formed by a simple molding process from a plastics material, using a single mold of a suitable shape.

Preferably, the device of this invention includes a tubular element which is associated with a holding/supply plate for the emission source, and is adapted to isolate the light emitted by the light source as well as to hold the diaphragm and converging lens.

According to an alternative embodiment of the inventive device, each of the two illuminating assemblies includes a V-like light guide placed on the emission path between the light source and the converging lens and adapted to generate a pair of optical paths set at angles, relative to the axis Z, of $\pm\phi_H/2$, respectively, on a second reference plane YZ. In this way, the four patterns can be obtained using only two light sources which are mounted at an inclination angle with respect to only one of the aforementioned reference planes.

In a particularly advantageous embodiment, the device of this invention further includes a means for determining the distance of the reading zone from the device. Advantageously, the device also includes a means for determining the orientation of the reading zone with respect to the device. This allows the selection and subsequent reading of the information in the reading zone to be sped up.

Preferably, the means for determining the distance and orientation of the reading zone comprise:
 a lens for picking up the light diffused from the illuminated portion of the reading zone;
 a means for sensing the image of the light diffused from the reading zone and picked up on the lens;
 a means for processing the image acquired by the sensing, means for calculating the distance and the orientation of the reading zone according to the diaphragm size, the distance between the sensing means and the diaphragm, the distance between the lens and the converging lens, and the size of the image acquired by the sensing means. Advantageously, the calculation of the distance and the determination of the orientation of the reading zone relative to the device is performed, through simple calculating software, according to structural parameters of the device and optical parameters relating to the light emission and receiving paths; these parameters are easily acquired.

In a second aspect, the invention relates to an optical apparatus for reading information, characterized in that it comprises an optical aiming device as previously indicated. Advantageously, such a reading apparatus is uniquely fast and reliable, since the reading operations are only performed after the zone which contains the information to be read has been suitably framed.

In a further aspect, this invention relates to a method for aiming and visually indicating a reading zone, characterized in that it comprises the steps of:
 generating, by means of a light source, at least one light beam for illuminating a portion of the reading zone along an emission path;
 selecting, by means of a shaped diaphragm, a portion of the light beam generated by the emission source;
 collimating, by means of a converging lens, the portion of the shaped light beam coming from the diaphragm;
 projecting, onto the reading zone portion, the light beam picked up on the converging lens.

Preferably, the method of this invention comprises a step of determining the distance of the reading zone. More preferably, the method of this invention comprises a step of determining the orientation of the reading zone with respect to the device.

Preferably, the steps of determining the distance and orientation of the reading zone comprise the following steps:

picking up, on a receiving lens, the light beam diffused from the illuminated portion of the reading zone;

acquiring, by a sensing means, the image of the light diffused from the reading zone and picked up on the receiving lens;

processing the acquired image to calculate the distance and the orientation of the reading zone according to the diaphragm size, the distance between the sensing means and the diaphragm, the distance between the receiving lens and the converging lens, and the size of the image picked up on the sensing means.

BRIEF DESCRIPTION OF THE DRAWINGS

Further features and advantages of this invention will be more clearly apparent from the following detailed description of a preferred embodiment thereof, given with reference to the accompanying drawings. In the drawings:

FIG. 3 is an exemplary sectional view, taken on a plane parallel to the reference plane YZ, showing schematically a second alternative embodiment of the device according to the invention;

FIG. 3A is an enlarged view of a portion of FIG. 3.

FIG. 4 is an exemplary sectional view, taken on a plane parallel to the reference plane YZ, showing schematically a further alternative embodiment of the device according to the invention;

FIG. 4A is an enlarged view of a portion of FIG. 4.

DETAILED DESCRIPTION

Figure 1:
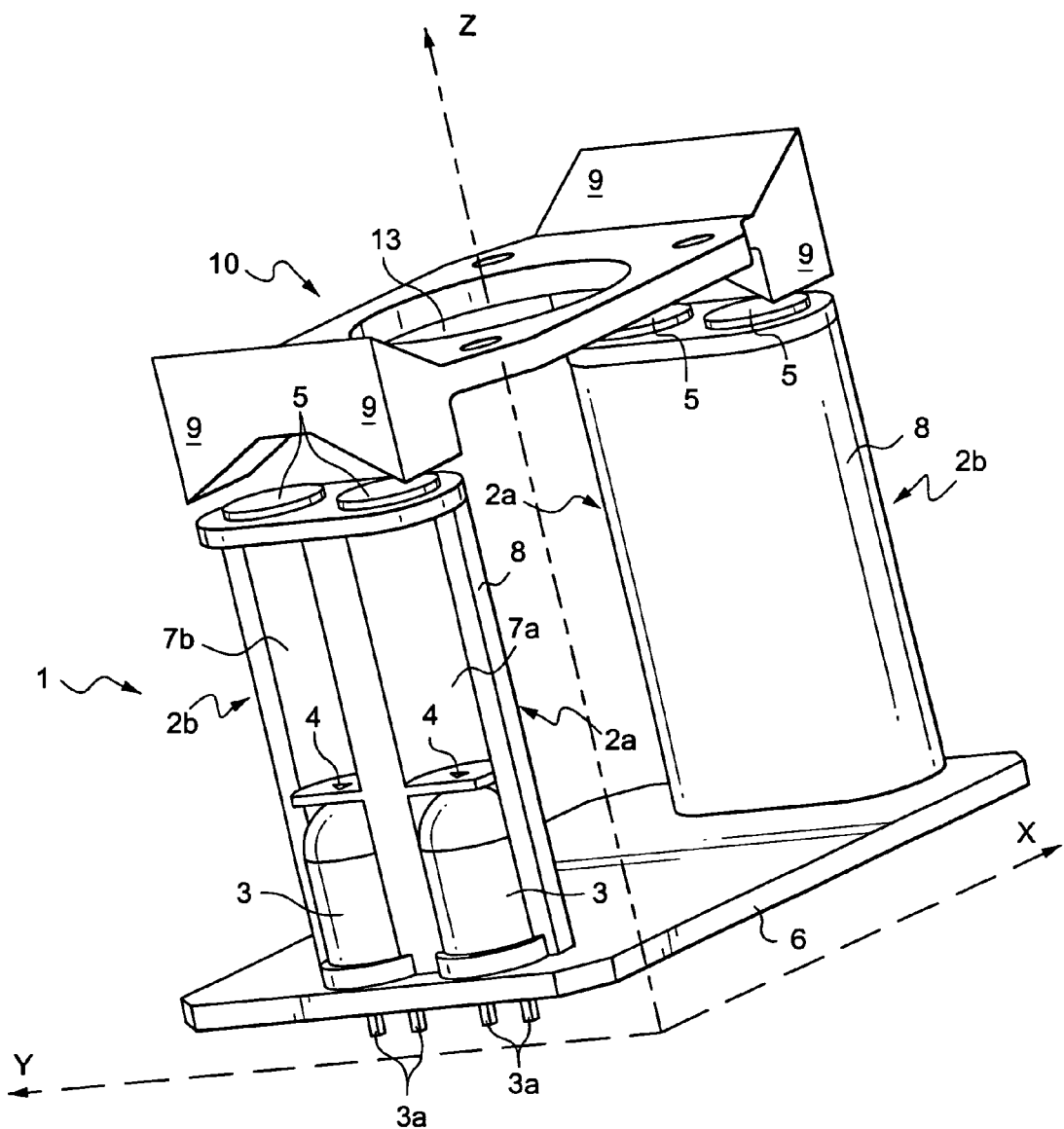
FIG. 1 is a perspective view showing schematically a preferred embodiment of a device according to this invention, as referred to a triad of reference axes XYZ.
Figure 2A:
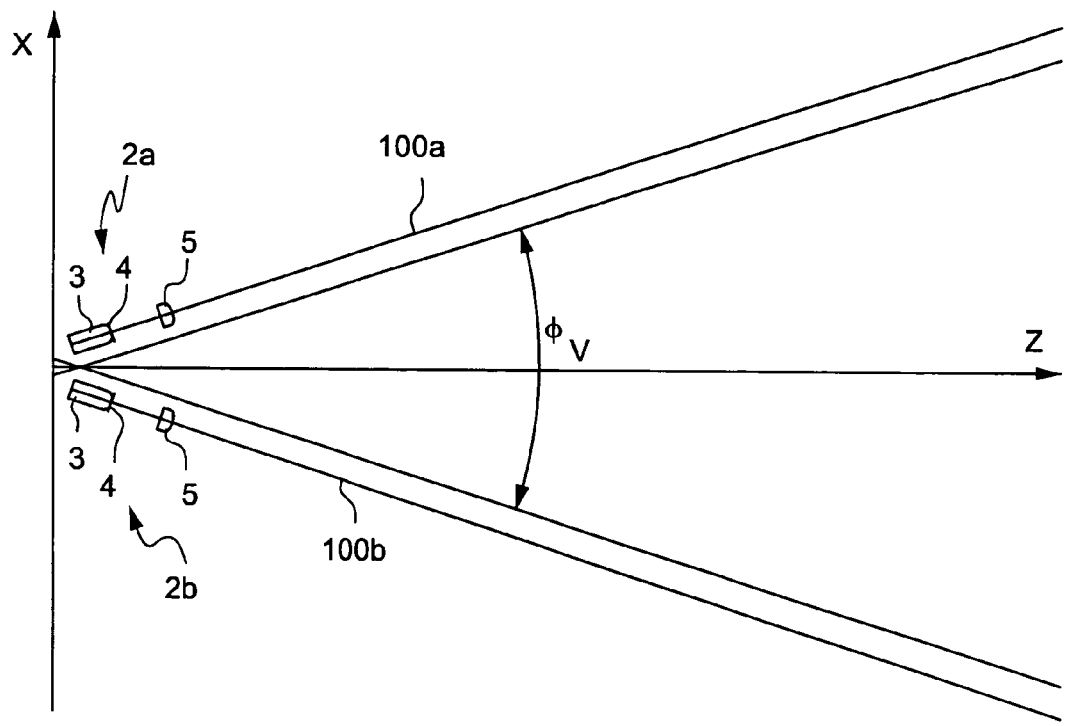
FIGS. 2a, 2b are exemplary sectional views, taken on respective planes parallel to the reference planes XZ and YZ, showing schematically a first alternative embodiment of the device according to the invention.
Figure 2B:
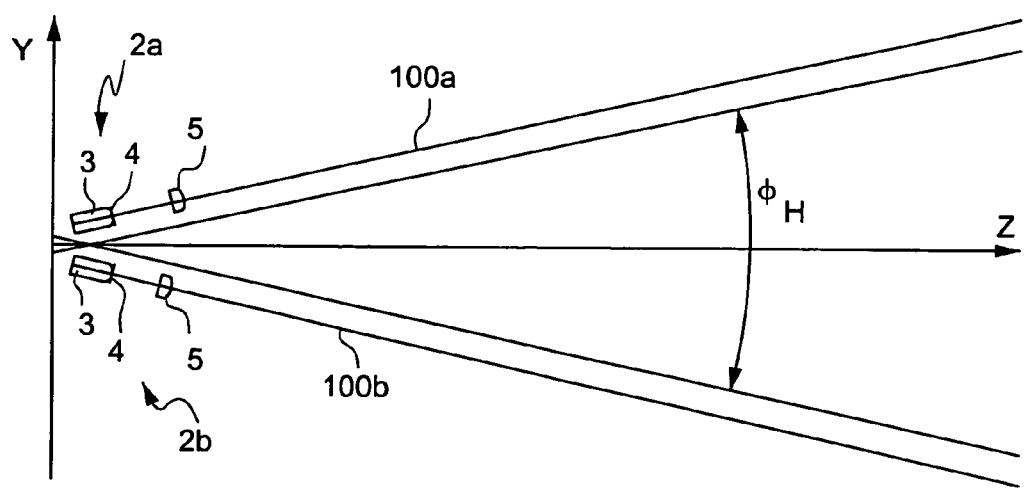
Figure 2C:
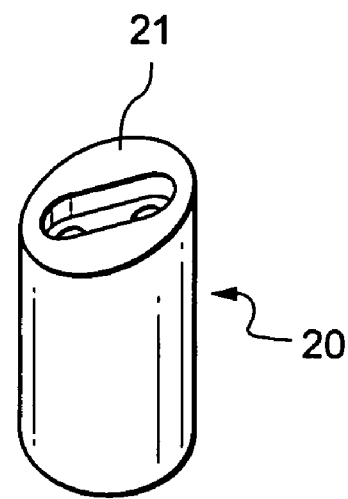
FIG. 2c is a perspective view showing schematically a mechanical holder element for a LED intended for being mounted on the embodiment of the inventive device shown in FIGS. 2a, 2b.
Figure 2D:
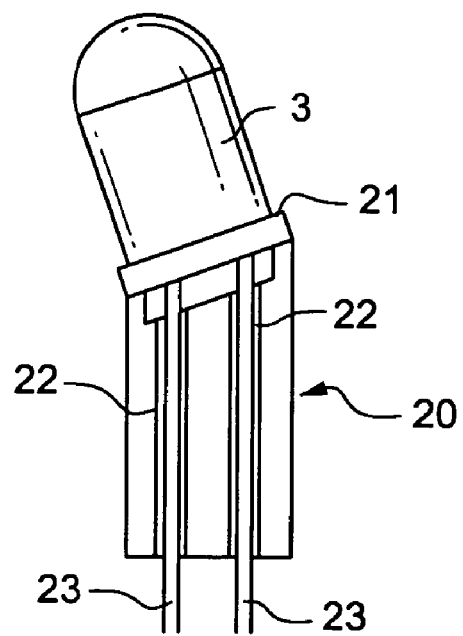
FIG. 2d is a sectional view of the element in FIG. 2c, shown in a working configuration thereof.

In the figures, an optical device for aiming and framing a reading zone, according to this invention, is shown at 1. The device 1 comprises two first illuminating assemblies, denoted by 2a, and two second illuminating assemblies, denoted by 2b, each adapted to illuminate opposed end portions of a reading zone (not shown) along respective optical emission paths (respectively denoted by 100a and 100b in FIGS. 2–4) to provide a visual indication of the extremities of the framed area. A longitudinal aiming axis Z of a reading area is defined in the device 1; this axis intersects an imaginary reading area, e.g. rectangular or circular in shape, at a central point thereof.

Each illuminating assembly 2a, 2b comprises a light source 3 (e.g. a LED (Light Emitting Diode) or a glow or fluorescent lamp), a diaphragm 4 having a preset shape, and a converging lens 5. The diaphragm 4 is placed downstream of the LED 3 to select a portion of the light emitted by the latter; the converging lens 5 is placed downstream of the diaphragm 4 to collimate the shaped light coming from the diaphragm 4 and project it onto a respective end portion of the reading area.

The converging lens 5 is located at an appropriate distance away from the diaphragm 4 such that the image of the diaphragm 4 is focused onto the reading zone.

The LEDs 3 are mounted on a holding/supply plate 6 therefor; the plate 6 is substantially perpendicular to the aiming axis Z and presents respective holes adapted to accommodate rheophores 3a of the LEDs 3. Also mounted on the plate 6 are four tubular elements 7a, 7b, each enclosing the LED 3 of one of the illuminating assemblies 2a, 2b thereinside and supporting the respective diaphragm 4 and converging lens 5. The tubular elements 7a, 7b, additionally to their mechanical support function, keep the light emitted by the LEDs 3 confined up to the converging lenses 5, and are defined in pairs within oppositely housing sockets 8 located on the plate 6, on the opposite side relative to the aiming axis Z.

Also defined in the device 1 of this invention are two symmetry planes, namely a first reference plane XZ and a second reference plane YZ, both containing the axis Z, which lie perpendicular to each other and are both substantially perpendicular to the holding/supply plate 6 of the LEDs 3.

As shown in FIG. 1, the device 1 further includes, located on each optical path 100a, 100b downstream of the converging lenses 5, a pair of light-deflecting prisms 9 formed integrally so as to define a double prism for each optical path 100a, 100b. Advantageously, each double prism 9 is formed integrally with the adjacent double prism located on the same side of the second reference plane YZ. These pairs of double prisms 9 are also associated with the pairs of double prisms located on the opposite side of the second reference plane YZ, by means of a mounting plate 10. The double prisms 9 and the mounting plate 10 are formed by a simple molding process from a plastics material, using a single mold of a suitable shape.

Alternatively, the double prisms 9 may be replaced with a single prism producing similar deflections in the optical paths 100a, 100b.

In the embodiment shown in FIG. 1, the two illuminating assemblies 2a and the two illuminating assemblies 2b are disposed parallel to the axis Z on the plate 6, at symmetrical positions relative to the first reference plane XZ and on opposite sides relative to the second reference plane YZ. The respective optical paths 100a, 100b are set, with respect to the axis Z, at an angle of $+\phi_v/2$ and $-\phi_v/2$ on the first reference plane XZ, and an angle of $+\phi_H/2$ and $-\phi_H/2$ on the second reference plane YZ, respectively.

A first path length extending from the respective LED 3 to the respective double prism 9, and a second path length extending from the double prism 9 to the reading zone are defined on the optical paths 100a, 100b of the first and second illuminating assemblies 2a, 2b. The first path lengths of the first and second illuminating assemblies 2a, 2b extend substantially parallel to the axis Z, while the second path lengths of the first and second illuminating assemblies 2a, 2b are inclined, owing to the presence of the double prisms 9, respectively by an angle of $+\phi_v/2$ and $-\phi_v/2$ on the first reference plane XZ and relative to the axis Z, and by an angle of $+\phi_H/2$ and $-\phi_H/2$ on the second reference plane YZ and relative to the axis Z.

In a first alternative embodiment (shown schematically in FIGS. 2a, 2b) of the device 1 according to the invention, the inclination angles $\pm\phi_v/2$ and $\pm\phi_H/2$ of the optical paths 100a, 100b are obtained, rather than by the double optical prisms 9, by arranging the illuminating assemblies 2a, 2b at an inclined position on the holding plate 6. Advantageously, substantially tubular elements 20 (shown in FIGS. 2c, 2d) are used, each provided with an upper surface 21 set at the aforementioned angles of $\pm\phi_v/2$ and $\pm\phi_H/2$ and having the LEDs 3 mounted thereon. The tubular elements 20 may have a cross-section whatever, e.g. a circular cross-sectional shape. The elements 20 are provided with sockets 22 for the electrical leads 23 of the LEDs 3 and are secured on the holding/supply plate 6 by the same electrical leads, which are soldered to the plate.

In a second alternative embodiment (shown schematically in FIG. 3) of the device 1 according to the invention, the illuminating assemblies 2a, 2b are mounted on the holding plate 6 at an inclined position relative to one only of the reference planes XZ, YZ. In this way, the first and second lengths of each of the optical emission paths 100a, 100b are set at the angles of $\pm\phi_v/2$ ($\pm\phi_H/2$) with respect to one of the first and second reference planes, the further inclination of the second path lengths by an angle of $\pm\phi_H/2$ ($\pm\phi_v/2$) with respect to the other of the reference planes being obtained by placing an optical deflection prism downstream (alternatively, upstream) of each diaphragm 4, The optical prisms 11 are made of a plastics material and may be placed, for example, between the LEDs 3 and the converging lenses 5. Advantageously, they may be integral with their respective converging lenses 5 to form a single optical element obtained, preferably, by a molding process of plastics material.

In a further alternative embodiment (shown in FIG. 4) of the device according to the invention, the device of this invention comprises only two groups of illuminating assemblies 2a, 2b mounted on the holding plate 6 at an angle with respect to the second reference plane YZ. To obtain the four patterns on the reading zone, a V-like light guide 12 is mounted downstream of each LED 3 for providing a pair of optical emission paths 100 which are inclined, relative to the axis Z, by an angle of $\pm\phi_H/2$ on the second reference plane YZ. Thus, upstream of the light guide 12, there are defined two optical emission paths set at the inclination angles of $\pm\phi_v/2$ relative to the axis Z on the first reference plane XZ, while defined downstream of the guides 12 are four optical emission paths 100 which are further inclined relative to the axis Z by the angles of $\pm\phi_H/2$ on the second reference plane YZ.

In a specially advantageous embodiment, the device of this invention also includes means (not shown) of picking up, along a receiving path substantially coincident with the axis Z, and storing and processing the shaped image diffused from the illuminated end portions of the reading zone, in order to determine the distance and the orientation of the latter with respect to the device.

In particular, these means comprise a lens (not shown) which is mounted in a respective seat 13 formed in the mounting plate 10 and has an optical axis coaxial with the optical axis Z. The lens, inter alia, picks up the light diffused from the illuminated end portions of the reading zone and projects it onto an appropriate sensing means (e.g. a CCD sensor). The last-mentioned means generate an image of the reading zone, and hence also of the shaped patterns, and are operatively associated with a processing means for the image acquired by the sensing means for calculating the distance and the orientation of the reading zone with respect to the device 1.

Specifically, the distance and orientation of the reading zone with respect to the device 1 are calculated by means of a simple calculation software, as functions of structural parameters of the device and optical parameters of the light emission and receiving paths. These parameters include the size of the diaphragms 4, the distance between the sensing means and the diaphragms 4, the distance between the lens and the converging lenses 5, and the size of the image acquired by the sensing means.

The aiming device of this invention, as described hereinabove, can advantageously be mounted inside an optical reader for properly pointing the reader at an area containing information to be read, so as to optimize subsequent information reading operations. This information may be, for example, a code (e.g. a bar code, two-dimensional code, or the like) arranged to univocally identify the objects carrying it, or handwriting such as a signature to be recognized, etc.

In operation, the operator aims the reader at an area containing the optical information to be read. By depressing a suitable control key, the operator causes the LEDs 3 to emit light beams which are suitable shaped through the diaphragms 4, picked up on the converging lenses 5, and projected onto the reading zone, where a read rectangle becomes displayed. The operator shifts the reader around until the information to be read is framed within the rectangle. At this point, the operator initiates the image acquisition and reading operations.

These image acquisition and reading operations can be sped up if the aiming device of the reader also performs, in accordance with this invention, a calculation of the distance and orientation of the reading zone.

In this case, the light diffused from the illuminated end portions of the reading zone is picked up on the receiving lens and projected onto the sensing means to generate an image of the reading area, and hence of the shaped patterns. These images are processed through calculation software to calculate the distance and orientation of the reading area relative to the reader, according to the size of the diaphragms 4, the distance between the sensing means and the diaphragms 4, the distance between the lens and the converging lenses 5, and the size of the image picked up on the sensing means.

Figure 5:
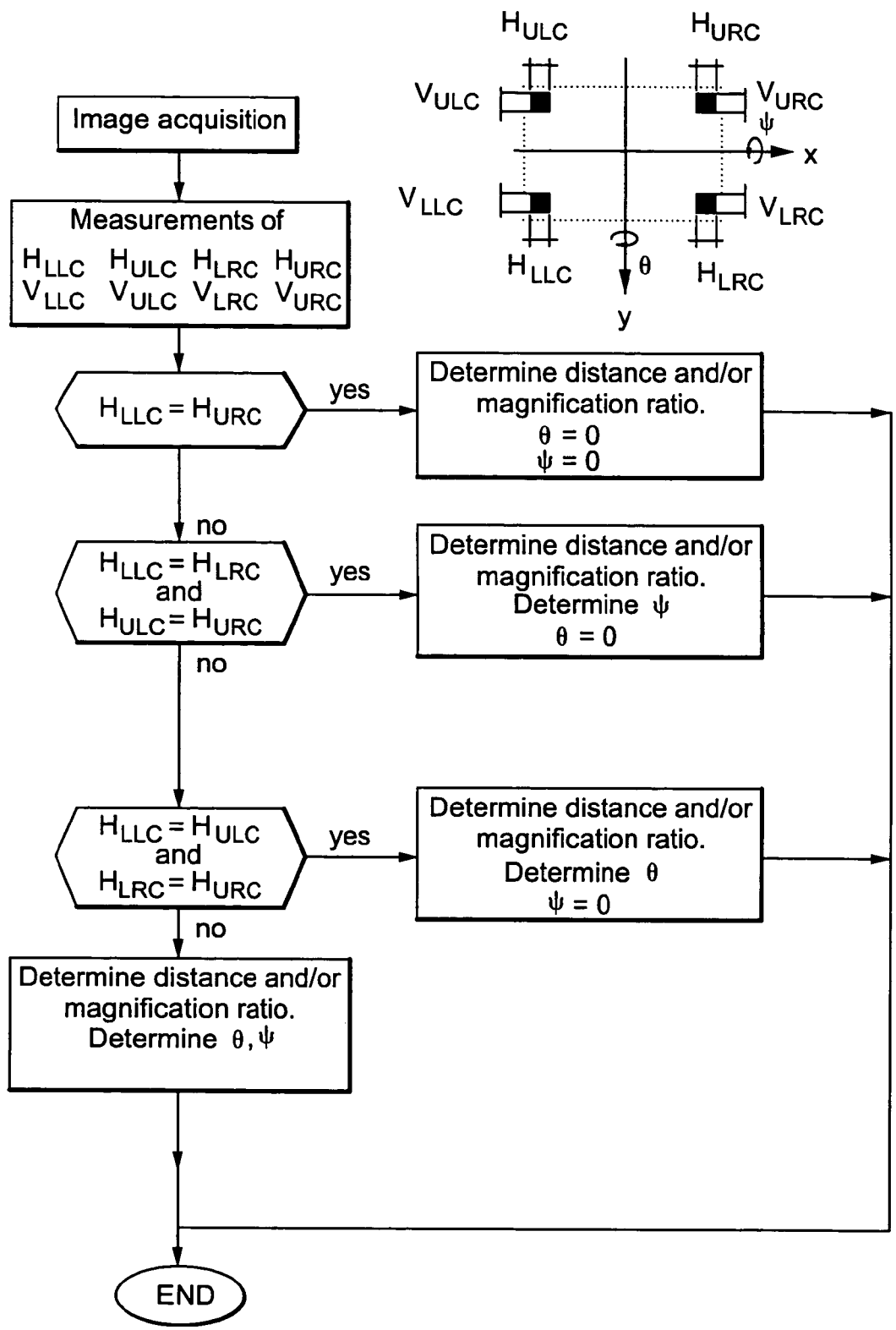
FIG. 5 is a flowchart of a method for calculating the distance and orientation of a reading area according to this invention.
Figure 7:
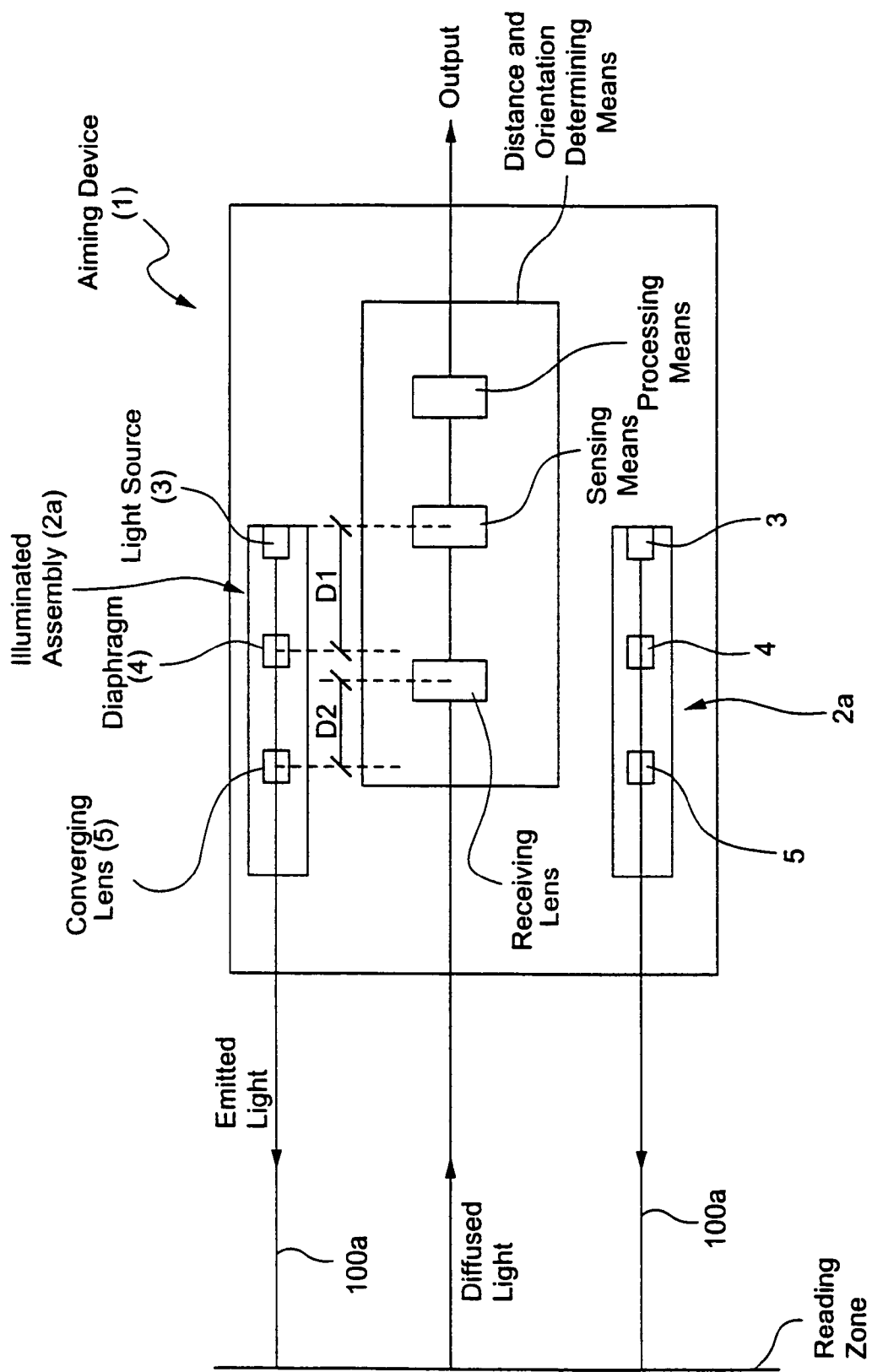
FIG. 7 is a block diagram of elements of the invention in their geometrical relationship.

Described herein below with reference to FIG. 5 and FIG. 7 is an example of a method for calculating the distance and orientation of the reading area by the aiming device described in the foregoing, assuming that a square shape for the four patterns is projected onto the reading area.

The following terms will be used hereinafter in relation to the pattern images picked up by the reader on a plane xy parallel to the reference plane XY:

$H_{ULC}$=horizontal dimension of the top left pattern;
$H_{URC}$=horizontal dimension of the top right pattern;
$H_{LLC}$=horizontal dimension of the bottom left pattern;
$H_{LRC}$=horizontal dimension of the bottom right pattern;
$V_{ULC}$=vertical dimension of the top left pattern;
$V_{URC}$=vertical dimension of the top right pattern;
$V_{LLC}$=vertical dimension of the bottom left pattern;
$V_{LRC}$=vertical dimension of the bottom right pattern.

Once the pattern images are acquired on the sensing means, their above-defined horizontal and vertical dimensions are calculated, and the horizontal dimensions of the top right and bottom left patterns are tested to be the same. If such test has a positive result, it means that the reading zone is perpendicular to the optical axis Z of the device, and therefore, the distance is calculated next and, by comparison with the dimensions of the projected patterns, a magnification ratio of the inventive device can also be calculated.

Figure 6:
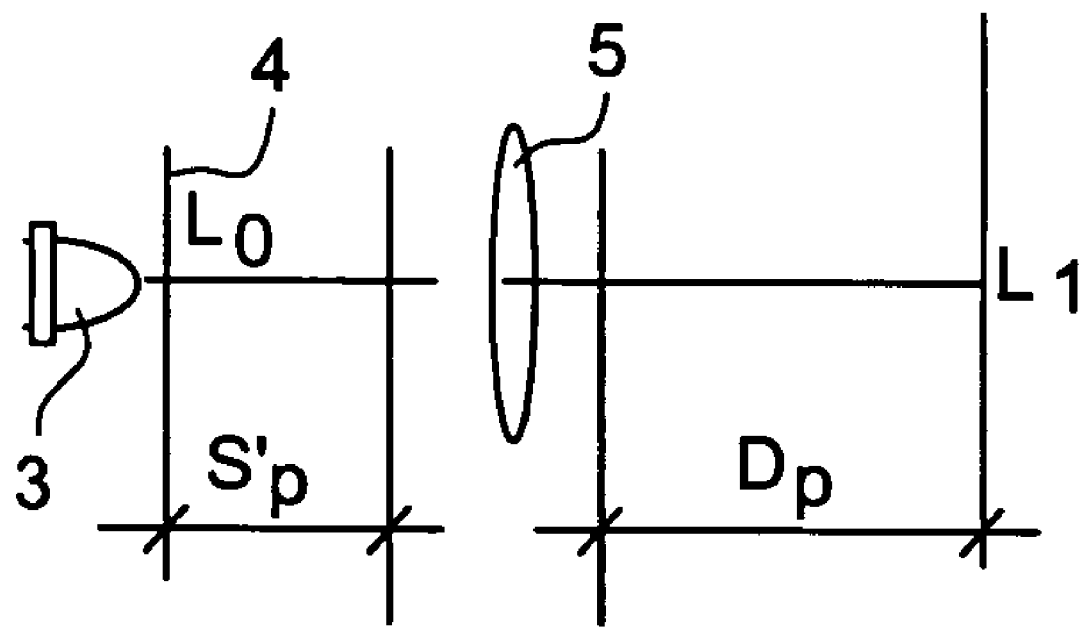
FIG. 6 is an exemplary diagram of the light emission and receiving paths in the device of FIG. 1.
Figure 6:
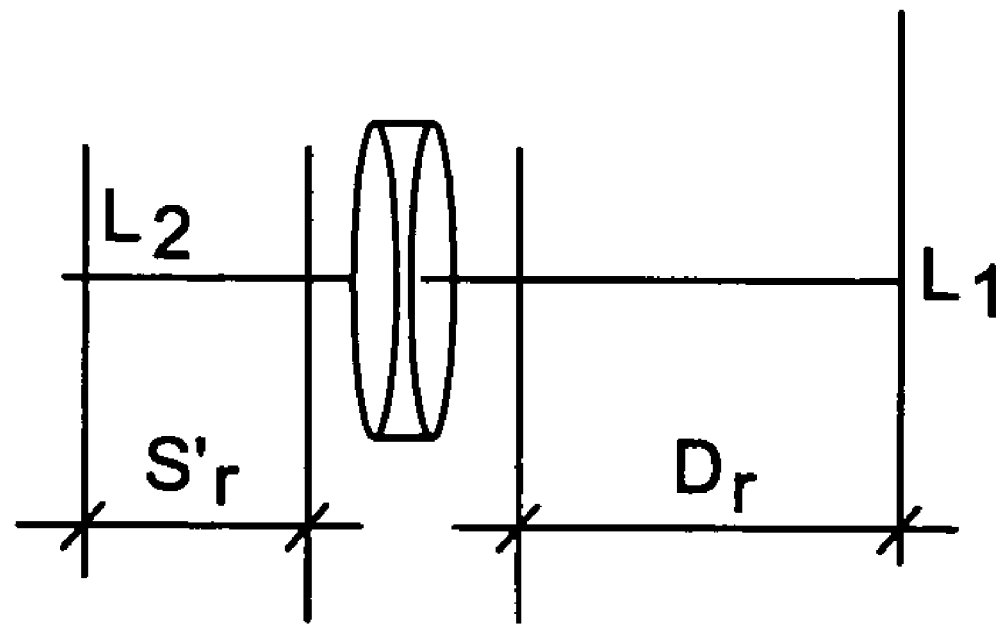

The distance is calculated using the following formula:

$$Dr = K \frac{\Delta D}{L_2 - K} \quad \text{where} \quad K = L_0 \frac{S_r'}{S_p'}$$

where (see more conveniently FIG. 6, which shows at the top the light emission path from the LED 3 to the reading zone, through the converging lens 5, and at the bottom, the receiving path for the light diffused from the reading zone to the sensing means via the lens): $D_r$ is the distance from the reading zone to the plane of the lens; $L_2$ is the size, in pixels, of the pattern image onto the sensing means (and hence, any of the above dimensions H and V); $L_0$ is the size of the diaphragm; $S_r'$ is the distance between the main image plane of the lens and the sensing means; $S_p'$ is the distance between the diaphragm and the main image plane of the converging lens; and $\Delta D$ is the distance between the main image plane of the lens and the converging lens. The main image plane of the lens (and converging lens) is a known optical characteristic typical of each lens (and converging lens) employed.

It should be noted that, to calculate the distance $D_r$, it must be $\Delta D \neq 0$; the designing criterion will, therefore, be that of maximizing the value of $\Delta D$, in order to enhance the sensitiveness of the method consistently with a compact size for the device.

If the above test has a negative result, it is tested if the horizontal dimension of the bottom left pattern is equal to that of the bottom right pattern, and the horizontal dimension of the top left pattern is equal to that of the top right pattern. If both the tests have positive results, additionally to determining the distance and/or the magnification ratio, the angle of rotation of the reading zone relative to the axis X, and accordingly, a distortion factor due to that rotation, can be determined. If one of the above mentioned tests has a negative result, a test is carried out to verify whether the horizontal dimension of the bottom left pattern is equal to that of the top left pattern, and whether the horizontal dimension of the bottom right pattern is equal to that of the top right pattern. If both the tests are successful, additionally to determining the distance and/or the magnification ratio, the angle of rotation of the reading zone relative to the axis Y, and hence a distortion factor due to that rotation, can be determined. If these tests also have negative results, it is an indication of the reading zone being oriented to present rotation both about the axis X and about the axis Y. Therefore, the relating rotation angles can be found, and the range and/or magnification ratio of the device calculated.

The invention claimed is:

1. An aiming device for visually indicating a reading zone, comprising at least one illuminating assembly active on a reading zone portion along an optical emission path, said at least one illuminating assembly comprising:
   a light source for emitting a light beam;
   a diaphragm having a preset shape for selecting as shaped light a portion of the light generated by said source, thereby allowing propagation of said selected portion of the light beam and preventing propagation of a remaining portion of the light beam; and
   a converging lens placed downstream of the diaphragm for collimating the shaped light coming from the diaphragm and projecting said shaped light onto the reading zone portion, thereby providing on the reading zone immediate visual feedback regarding the position of said shaped light relative to the reading zone.

2. A device according to claim 1, wherein the converging lens is positioned at a suitable distance away from the diaphragm such that a sharp pattern of the shaped light coming from the diaphragm is generated onto the reading zone portion.

3. A device according to claim 1, further comprising at least one optical deflection prism disposed on the optical emission path.

4. A device according to claim 1, further comprising a tubular element associated with a holding/supplying plate for the light source and adapted to isolate the light emitted by the source and hold the diaphragm and converging lens.

5. An optical apparatus for reading information, including an aiming device for visually indicating along a Z axis a reading zone, comprising at least one illuminating assembly active on a reading zone portion along an optical emission path, said at least one illuminating assembly comprising:
   a light source for emitting a light beam;
   a diaphragm having a preset shape for selecting as shaped light a portion of the light generated by said source, thereby allowing propagation of said selected portion of the light beam and preventing propagation of a remaining portion of the light beam; and
   a converging tens placed downstream of the diaphragm for collimating the shaped light coming from the diaphragm and projecting it onto the reading zone portion, thereby providing on the reading zone immediate visual feedback regarding the position of said shaped light relative to the reading zone.

6. A method for aiming and visually indicating a reading zone, characterized in that the method comprises the steps of:
   generating, by means of a light source, at least one light beam for illuminating a portion of the reading zone along an emission path;
   selecting, by means of a shaped diaphragm, a portion of the light beam generated by the light source as shaped light, thereby allowing propagation of said selected portion of the light beam and preventing propagation of a remaining portion of the light beam;
   collimating, by means of a converging lens, the selected portion of the shaped light coining from the diaphragm; and
   projecting, onto the reading zone, the shaped light beam picked up on the converging lens, thereby providing on the reading zone immediate visual feedback regarding the position of said shaped light relative to the reading zone.

7. An aiming device for visually indicating a reading zone, the device comprising at least two first illuminating assemblies disposed on opposite sides with respect to an aiming axis Z and active on respective portions of the reading zone along respective optical emission pats in order to identify on the reading zone respective patterns, wherein each of said at least two first illuminating assemblies comprises:
   a light source for emitting a light beam;
   a diaphragm having a preset shape for selecting as shaped light a portion of the light generated by said source, thereby allowing propagation of said selected portion of the light beam and preventing propagation of a remaining portion of the light beam; and a converging lens placed downstream of the diaphragm for collimating the shaped light coming from the diaphragm and projecting the shaped light onto the reading zone portion, thereby providing on the reading zone immediate visual feedback regarding the position of said shaped light relative to the reading zone.

8. A device according to claim 7, wherein the converging lens is positioned at a suitable distance away from the diaphragm such that a sharp pattern of the shaped light coming from the diaphragm is generated onto the reading zone portion.

9. A device according to claim 7, wherein said at least two first illuminating assemblies are disposed symmetrically relative to the aiming axis Z such that their respective optical emission paths identify a linear portion on the reading zone.

10. A device according to claim 7, comprising at least two second illuminating assemblies disposed symmetrically relative to the aiming axis Z and active on respective portions of the reading zone along respective optical emission pats such that these optical emission paths identify, jointly with the optical paths of the first illuminating assemblies, a quadrangular portion on the reading zone.

11. A device according to claim 10, further comprising at least two tubular elements associated with a holding/supplying plate for the light sources, each tubular element being adapted to isolate the light emitted by the source and hold the diaphragm and converging lens.

12. A device according to claim 10, wherein each illuminating assembly comprises a V-like light guide disposed, on the emission path, between the light source and the converging lens and effective to generate a pair of optical paths respectively set, relative to the axis Z, at an angle of $\pm\phi_H/2$ on a second reference plane YZ.

13. A device according to claim 10, further comprising a means for determining a distance of the reading zone from the device.

14. A device according to claim 10, further comprising a means for determining an orientation of the reading zone with respect to the device.

15. A device according to claim 7, wherein each light source generates an inclined optical beam with respect to a first and a second reference plane XZ, YZ lying perpendicular to and intersecting each other along the aiming axis Z.

16. A device according to claim 15, comprising at least two first illuminating assemblies disposed symmetrically relative to the aiming axis Z such that their respective optical emission paths identify a linear portion on the reading zone, wherein the optical paths of the first illuminating assemblies are set, relative to the axis Z, at an angle of $+\phi_v/2$ and $-\phi_v/2$, respectively, on the first reference plane XZ, and at an angle of $+\phi_H/2$ and $-\phi_H/2$, respectively, on the second reference plane YZ.

17. A device according to claim 15, comprising at least two second illuminating assemblies disposed symmetrically relative to the aiming axis Z and active on respective portions of the reading zone portion along respective optical emission paths such that these optical emission paths identify, jointly with the optical paths of the first illuminating assemblies, a quadrangular portion of the reading zone, wherein the optical paths of the second illuminating assemblies are set, relative to the axis Z, at an angle of $+\phi_v/2$ and $-\phi_v/2$, respectively, on the first reference plane XZ, and at an angle of $+\phi_H/2$ and $-\phi_H/2$, respectively, on the second reference plane YZ.

18. A device according to claim 17, comprising at least two substantially tubular elements, each having an inclined upper surface for accommodating the light source of one of said at least two illuminating assemblies such that the optical path of the illuminating assembly is inclined at angles of $\pm\phi_v/2$ and $\pm\phi_H/2$ relative to the axis Z.

19. A device according to claim 17, wherein each optical emission path of the first and second illuminating assemblies comprises a first path length set, relative to the axis Z, at an angle of $+\phi_v/2$ and $-\phi_v/2$ and $+\phi_H/2$ and $-\phi_v/2$, respectively, on the first and second reference planes XZ and YZ, and a second path length set, relative to the axis Z, at an angle of $+\phi_v/2$ and $-\phi_v/2$ and $+\phi_H/2$ and $-\phi_v/2$, respectively, on the first and second reference planes XZ and YZ, and at an angle of $+\phi_H/2$ and $-\phi_H/2$ and $+\phi_H/2$ and $-\phi_v/2$, respectively, on the second and first reference planes YZ and XZ.

20. A device according to claim 19, further comprising at least one optical deflection prism disposed on each optical emission path, wherein the optical deflection prism is effective to deflect the second path lengths through angles of $\pm\phi_H/2$ and $\pm\phi_v/2$.

21. A device according to claim 17, wherein each optical emission path of the first and second illuminating assemblies comprises a first path length substantially parallel to the aiming axis A and a second path length set, relative to the axis Z, at an angle of $+\phi_v/2$ and $-\phi_v/2$, respectively, on the first reference plane XZ, and at an angle of $+\phi_H/2$ and $-\phi_v/2$, respectively, on the second reference plane YZ.

22. A device according to claim 21, comprising a pair of optical deflection prisms arranged on each optical emission path and effective to deflect the second path lengths through angles of $\pm\phi_H/2$ and $\pm\phi_v/2$.

23. A device according to claim 22, wherein the optical prisms of each pair of optical prisms are of a integral construction and are placed downstream of the converging lens on the optical emission path.

24. A device according to claim 22, wherein the optical prism of each pair of optical prisms is formed integrally with the optical prism of the pair of prisms situated on the same side with respect to the second reference plane YZ.

25. A device according to claim 24, wherein the optical prisms of each pair of optical prisms are of integral construction and are placed downstream of the converging lens on the optical emission path, wherein the pairs of optical prisms situated on the opposite side with respect to the second reference plane YZ are mutually associated by a mounting plate.

26. A device according to claim 21, comprising a single optical deflection prism arranged on each optical emission path downstream of the converging lens and effective to deflect the second path lengths through angles of $\pm\phi_H/2$ and $\pm\phi_v/2$.

27. A device according to claim 7, further comprising at least one optical deflection prism disposed on each optical emission path.

28. An aiming device for visually indicating a reading zone, the device comprising
at least two first illuminating assemblies disposed on opposite sides with respect to an aiming axis Z and active on respective portions of the reading zone along respective optical emission paths in order to identify on the reading zone respective patterns, wherein each of said at least two first illuminating assemblies comprises:
a light source for emitting a light beam;
a diaphragm having a preset shape for selecting as shaped light a portion of the light generated by said source, thereby allowing propagation of said selected portion of the light beam and preventing propagation of a remaining portion of the light beam;

a converging lens placed downstream of the diaphragm for collimating the shaped light coming from the diaphragm and projecting the shaped light onto the reading zone portion, thereby providing on the reading zone immediate visual feedback regarding the position of said shaved light relative to the reading zone;

at least two second illuminating assemblies disposed symmetrically relative to the aiming axis Z and active on respective portions of the reading zone along respective optical emission paths such that these optical emission paths identity, jointly with the optical paths of the first illuminating assemblies, a quadrangular portion on the reading zone;

means for determining an orientation of the reading zone with respect to the device;

means for determining a distance of the reading zone from the device, wherein the means for determining said distance and orientation of the reading zone comprises:
a lens for picking up the light diffused from the illuminated portion of the reading zone;
means for sensing an image of the light diffused from the reading zone and picked up on the lens;
means for processing the image acquired by the sensing means for calculating the distance and orientation of the reading zone according to the size of the diaphragm, a distance between the diaphragm and a main image plane of the converging lens, a distance between a main image plane of the lens and the sensing means, a distance between the lens and the converging lens, and a size of the image acquired by the sensing means.

29. An optical apparatus for reading information, comprising an aiming device for visually indicating a reading zone, the device comprising at least two first illuminating assemblies disposed on opposed sides with respect to an aiming axis Z and active on respective portions of the reading zone along respective optical emission paths in order to identify on the reading zone respective patterns, wherein each of said at least two first illuminating assemblies comprises:
a light source for emitting a light beam;
a diaphragm having a preset shape for selecting as shaped light a portion of the light generated by said light source, thereby allowing propagation of said selected portion of the light beam and preventing propagation of a remaining portion of the light beam;
a converging lens place downstream of the diaphragm for collimating the shaped light coming from the diaphragm and projecting the shaped light onto the reading zone portion, thereby providing on the reading zone immediate visual feedback regarding the position of said shaped light relative to the reading zone.

30. A method for aiming and visually indicating a reading zone, wherein the method comprises the steps of:
generating, by means of at least two light sources, at least two tight beams for illuminating respective portions of the reading zone along respective emission paths;
selecting, by means of shaped diaphragms having a predetermined size, a portion of each of the light beams generated by the light sources as shaped light beams comprising shaped light, thereby allowing propagation of said selected portions of each of the light beans and preventing propagation of remaining portions of each of the light beams;
collimating, by means of converging lenses, the shaped light beams coming from the diaphragms;
projecting, onto the reading zone portion, the shaped light beams picked up on the converging lenses in order to identify on the respective portions of the reading zone respective patterns and provide on the reading zone immediate visual feedback regarding the position of said patterns.

31. A method according to claim 30, comprising the step of determining a distance of the reading zone.

32. A method according to claim 30, comprising the step of determining an orientation of the reading zone.

33. A method for aiming and visually indicating a reading zone, wherein the method comprises the steps of:
generating, by means of at least two light sources, at least two tight beams for illuminating respective portions of the reading zone along respective emission paths;
selecting, by means of shaped diaphragms having a predetermined size, a portion of each of the light beams generated by the light sources as shaped light beams comprising shaped light, thereby allowing propagation of said selected portions of each of the light beams and preventing pronapation of remaining portions of each of the light beams;
collimating, by means of converging lenses, the shaped light beams coming from the diaphragms;
projecting, onto the reading zone portion, the shaped light beams picked up on the converging lenses in order to identify on the respective portions of the reading zone respective patterns and provide on the reading zone immediate visual feedback regarding the position of said patterns;
determining a distance of the reading zone, wherein the step of determining the reading zone distance comprises the following steps:
picking up, on a receiving lens, the light beam diffused from the illuminated portion of the reading zone;
acquiring, on a sensing means, an image of the light diffused from the reading zone and picked up on the receiving lens;
processing the acquired image to calculate the distance of the reading zone according to the size of the diaphragm, a distance between the diaphragm and a main image plane of the converging lens, a distance between a main plane of the receiving lens and the sensing means, a distance between the receiving lens and the converging lens, and a size of the image picked up on the sensing means.

34. An aiming device for visually indicating a reading zone, the device comprising at least two first illuminating assemblies disposed on opposed sides with respect to an aiming axis Z and active on opposed portions of the reading zone along respective optical emission pats in order to identify on the reading zone at least two discrete patterns, wherein each of said at least two first illuminating assemblies comprises:
a light source for emitting a light beam;
a diaphragm having a preset shape for selecting as shaped light a portion of the light generated by said source, thereby allowing propagation of said selected portion of the light beam and preventing propagation of a remaining portion of the light beam;
a converging lens placed downstream of the diaphragm for collimating the shaped light coming from the diaphragm and projecting the shaped light onto the reading zone portion, thereby providing on the reading zone immediate visual feedback regarding the position of said discrete patterns.

* * * * *